United States Patent [19]
Rupp, II

[11] 3,753,578
[45] Aug. 21, 1973

[54] FRONT FORK CONSTRUCTION FOR A CYCLE

[75] Inventor: Herbert E. Rupp, II, Mansfield, Ohio

[73] Assignee: Rupp Industries, Inc., Mansfield, Ohio

[22] Filed: Feb. 25, 1972

[21] Appl. No.: 229,395

[52] U.S. Cl. .............................. 280/276, 280/284
[51] Int. Cl. ............................................ B62k 21/02
[58] Field of Search ........................... 280/276, 284

[56] References Cited
FOREIGN PATENTS OR APPLICATIONS
528,597   5/1954   Belgium .............................. 280/276
180,580   1/1907   Germany ............................. 280/276

*Primary Examiner*—Philip Goodman
*Attorney*—Blythe D. Watts et al.

[57] ABSTRACT

A front fork construction for a cycle in which circumferential rib and groove engagements near the lower end of an inner bearing or lining tube retain it in the upper load tube and retain a ferrule in fixed position on the upper tube and in sliding engagement with the lower tube for excluding dust from the sliding joint between the tube.

5 Claims, 5 Drawing Figures

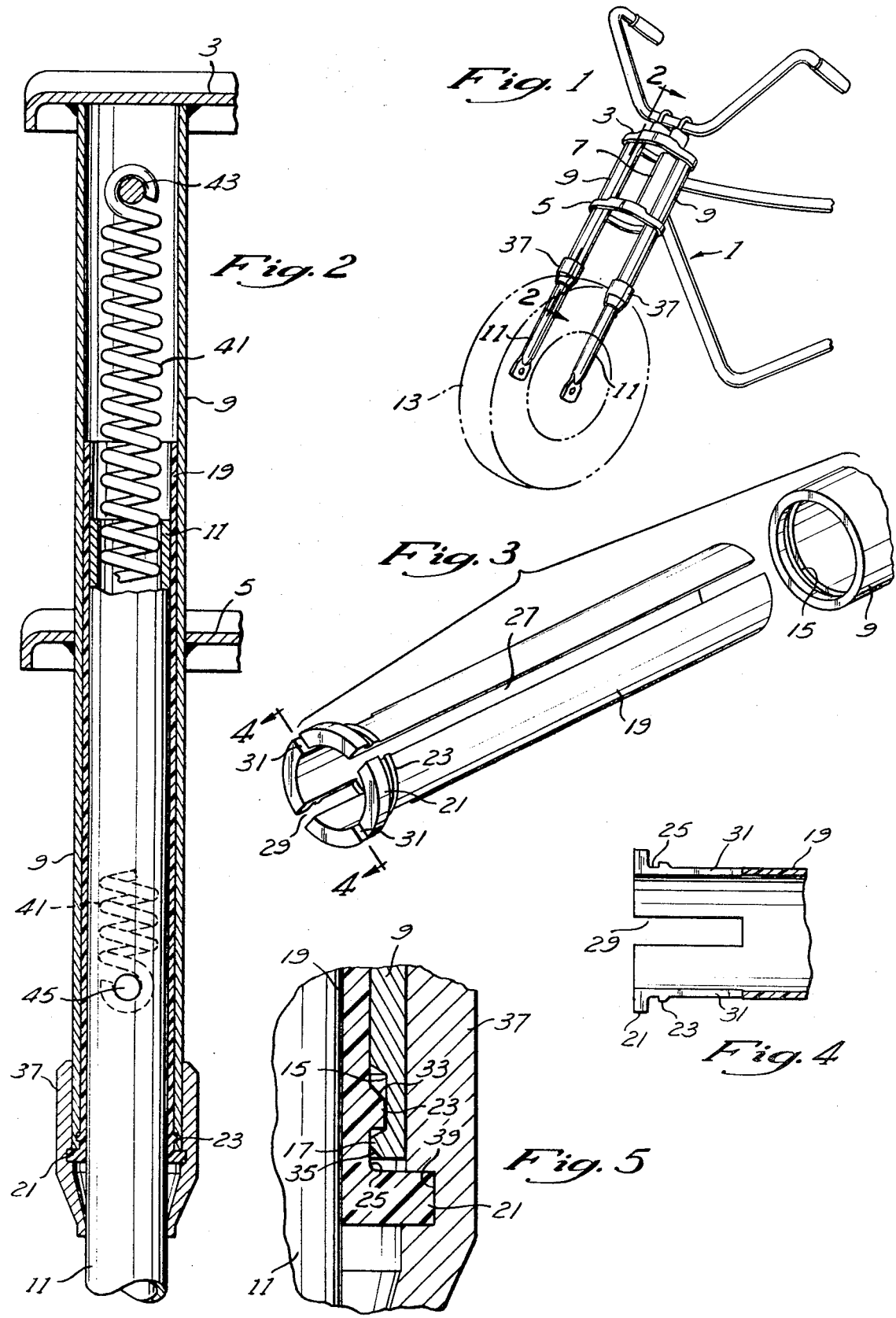

FRONT FORK CONSTRUCTION FOR A CYCLE

BACKGROUND

It has been proposed heretofore to place an inner antifriction lining tube within the upper load tube and around the lower load tube of a cycle fork with the lining tube being held in position in the upper load tube by engagement of a small circumferential rib on the outside thereof in an inwardly facing groove in the upper load tube. This proposed construction has not proven to be satisfactory for dirt could enter the space between the tubes and scratch and otherwise impair the operation of the lower load tube in the lining tube.

SUMMARY

The present invention aims to provide a simplified assembly of parts having circumferential rib and groove engagements in which a lining tube performs the double function of retaining itself in the upper load bearing rube and retaining a dirt-excluding seal or ferrule in fixed position on the upper tube and in sliding position on the lower tube below the sliding joint between the tubes.

According to this invention, an inner lining tube is provided near its lower end with outwardly projecting, radially long and short, circumferential ribs and an outwardly facing groove therebetween and is contractable by reason of longitudinally extending slots. The upper load tube is provided near its lower end with a radially short rib to seat in said groove of the lining tube and a radially short inwardly facing groove to receive said radially short rib on the bearing tube. A dirt-excluding ferrule is provided with an inwardly facing groove in which the radially long rib of the bearing tube seats. By reason of such interengagement the ferrule is fixed in position on the upper load tube and in dirt-excluding position with respect to the sliding joint between the tubes, and in sliding engagement with the lower load tube.

The just described parts may be assembled by collapsing the lower end of the lining tube, inserting it in the upper load tube, sliding the ferrule over the lower end of the upper tube until the groove in the ferrule is adjacent to the lower end of the upper tube, removing the collapsing force from the lining tube and allowing the ribs of said tubes to seat in the grooves of each other and the radially long rib on the lining tube to seat in the groove in the ferrule. Then the lower load tube may be moved endwise in the ferrule and the lining tube with resultant locking of the lining tube, upper tube and ferrule in the assembled position.

A spring is disposed within and attached at its lower end to the lower load by a pin extending through the lower tube with its ends flush with the outer surface of the liner tube. The lower tube and spring may then be moved longitudinally in the ferrule and lining tube and secured in place by engaging the upper end of the spring with a bolt extending transversely through the upper tube. The spring absorbs loads sustained by the cycle.

BRIEF DESCRIPTION OF THE DRAWINGS

The present invention will be better understood by reference to the accompanying drawings, in which:

FIG. 1 is a fragmentary, perspective view of a cycle embodying the present invention;

FIG. 2 is a longitudinal, sectional view taken on line 2—2 of FIG. 1;

FIG. 3 is a fragmentary, perspective view of the upper load tube and the inner bearing tube in exploded position;

FIG. 4 is an enlarged, fragmentary, sectional view, partly in elevation, taken on line 4—4 of FIG. 3; and FIG. 5 is an enlarged, fragmentary, sectional view of the lower ends of the upper load tube, the inner bearing tube or bushing, and the seal or ferrule.

In FIG. 1 the frame of a cycle is designated generally at 1. Upper and lower yoke plates 3 and 5 are linked by a spindle (not shown) which freely turns within frame tube 7 to affect steering. The upper ends of two upper load tubes 9 are welded to the under side of the uppe plate 3. Those tubes 9 extend through holes in the lower yoke 5 and are welded thereto. Lower load tubes 11 are attached at their lower ends to the axle (not shown) of a cycle wheel 13, shown in phantom in FIG. 1.

Since the structure of the ssemblies of load tube, inner tube, ferrule and spring are alike, only one assembly will be described.

The lower end of the upper load tube 9 is provided with an inwardly facing, radially short, circumferential groove 15, partly defined by radially short inwardly projecting rib 17. An inner bearing tube 19, which may be composed of nylon or other suitable anti-friction material, is disposed within tube 9. One end of tube 19 is provided with circumferential, outwardly extending annular ribs 21 and 23 and an outwardly facing groove 25 between those ribs. Rib 23 and groove 25 are radially short and rib 21 is radially long enough to project beyond the outer surface of tube 9. Inner tube 19 has a wide slot 27 which extends for its full length but, optionally, may extend only far enough beyond the rib bearing end of the tube to permit that end to be compressed enough to enter the upper load tube. Tube 19 also has an opposite slot 29 of substantially the same width as slot 27 but extending only a short distance beyond rib 23, and has one or more, preferably two, short, narrower slots 31 of substantially the same length as slot 29. Preferably end slots 27, 29 and 31 are spaced equally around the circumference of tube 19 and facilitate uniform compression of the lower end of tube 19.

When the inner tube is slid lengthwise in the upper load tube, the inner tube will be compressed in the region of its ribs by engagement of the inclined surface 33 of rib 23 with an oppositely inclined surface 35 of rib 17 of the upper load tube. Such engagement, together with further endwise movement of the inner bearing tube, results in the seating of the ribs 17 and 23 in grooves 15 and 25 of the upper load tube and the inner bearing tube. These interfitting ribs and grooves serve to maintain the upper load tube and the inner bearing tube in assembled position.

A dirt seal or ferrule 37 surrounds and has close fitting engagement with the outer surface of the lower end of the upper load tube and has sliding engagement with the lower load tube below the sliding joint between the inner and lower tubes. Ferrule 37 may be assembled on the outer tube 9 by compressing the lower end of tube 19 and sliding the ferrule longitudinally onto the lower end of the upper load tube until the rib 21 of the inner tube 19 is opposed to groove 39 in the ferrule. Release of the compressive forces applied to the inner tube 19 will permit the rib 21 to seat in recess 39 thereby holding the ferrule in fixed position relative to the upper tube 9. The lower load tube 11 may then be inserted in the lower end of the ferrule and moved endwise up into the inner tube 19.

A load absorbing spring 41 is disposed within the tubes, the upper end, being positioned by a bolt 43 in the upper tube 9 and the lower end being positioned by a pin 45 in the lower tube 11. The ends of pin 45 do not project beyond the outer surface of tube 11. Normally this spring is not preloaded but is compressed somewhat by the weight of the cycle.

The upper tube 9 may be composed of metal and a simple turning operation will form groove 15 therein. The inner tube 19 may be composed of nylon or other suitable anti-friction material and may be made to size and provided with its ribs and grooves by a molding operation. Thus machining operations are avoided with resultant cost savings. The dirt seal or ferrule 37 may be molded from a suitable elastomeric material. From the foregoing description, it will be understood that the present invention simplifies the construction and reduces the cost of making an improved front fork assembly for a cycle.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A front fork assembly for a cycle comprising an upper load tube, an anti-friction lining tube therewithin, a lower load tube in said lining tube and a ferrule around the upper tube, slidably engaging the lower tube and fixed in position by interengagement with the lining tube.

2. The combination of elements set forth in claim 1 in which the lower end of the lining tube has rib and groove engagement with the lower end of the upper tube and with the ferrule.

3. The combination of elements set forth in claim 1 in which the lower end of the inner tube is slotted longitudinally and rendered inwardly deflectable for assembly in interlocking engagement with the upper tube and ferrule.

4. The combination of elements set forth in claim 2 in which one rib on the lining tube lies adjacent to the lower end of the upper tube and extends radially outward beyond the outer surface of the upper tube and into a groove in the ferrule.

5. The combination of elements set forth in claim 1 in which the ferrule and the lower end of the upper tube have annular inwardly facing grooves and the lower end of the lining tube has outwardly projecting ribs to seat in said grooves.

* * * * *